United States Patent [19]

Liu

[11] Patent Number: 5,247,448
[45] Date of Patent: Sep. 21, 1993

[54] USING SPECTRAL SIGNATURE ANALYSIS IN PRODUCING SUBSTRATES FOR MAGNETIC MEDIA

[75] Inventor: Joseph C. Liu, Bloomington, Minn.

[73] Assignee: Seagate Technology, Inc., Scotts Valley, Calif.

[21] Appl. No.: 648,216

[22] Filed: Jan. 31, 1991

[51] Int. Cl.⁵ ............................................. G06F 15/46
[52] U.S. Cl. .................................... 364/468; 364/576
[58] Field of Search ..................... 364/468, 566, 576; 356/237; 324/454; 73/1 R; 427/240, 128-132

[56] References Cited

U.S. PATENT DOCUMENTS

| | | | |
|---|---|---|---|
| 4,479,090 | 10/1984 | Frater et al. | 324/454 |
| 4,702,101 | 10/1987 | Abbe et al. | 73/1 R |
| 4,808,455 | 2/1989 | Wada et al. | 427/128 |
| 4,850,695 | 7/1989 | Mikuriya et al. | 356/237 |

OTHER PUBLICATIONS

"An Automated System For Production Quality Assurance Using Mechanical Signature Analysis" by Joseph Cheng-Tsu Liu, 1982.

*Primary Examiner*—Jerry Smith
*Assistant Examiner*—Jim Trammell
*Attorney, Agent, or Firm*—Kinney & Lange

[57] ABSTRACT

A formation process has a plurality of process steps performed according to a set of process parameters. The formation process is used to form substrates in magnetic discs. A displacement signal is obtained which is representative of surface displacement of the substrate after at least one of the process steps. A first spectral signature is determined based on the displacement signal. The first spectral signature has characteristics representative of the surface displacement of the substrate when processed according to a first set of process parameters. The first spectral signature is compared with a second spectral signature having characteristics indicative of surface displacement of a substrate when processed according to a second set of process parameters. Based on the comparison, the set of process parameters is identified which provides a spectral signature closest to a desired spectral signature.

17 Claims, 7 Drawing Sheets

STANDARD PROCESS OUTER RADIUS

STANDARD PROCESS MIDDLE RADIUS

STANDARD PROCESS INNER RADIUS

DDGR Process

DDGK PROCESS

USING SPECTRAL SIGNATURE ANALYSIS IN PRODUCING SUBSTRATES FOR MAGNETIC MEDIA

BACKGROUND OF THE INVENTION

The present invention deals with the formation of substrates used in magnetic media. More particularly, the present invention uses spectral signature analysis for monitoring a process of forming substrates used in magnetic discs.

A magnetic disc, such as one used in a computer disc drive, is a flat circular platter with a magnetic surface on which data can be stored by selective polarization of portions of the magnetic surface. The presence or absence of polarity transitions between the polarized portions represents particular binary values. Typically, the magnetically polarized portions are arranged in a plurality of radially concentric tracks on the disc surface to aid in location and read back of the data.

A magnetic transducer moving relative to the magnetic disc along a given track generates an electrical signal (the "read signal"), which is related to the states of polarization encountered along the track. The magnetic transducer is mounted on a read/write head which has an air bearing for creating a hydrodynamic lifting force during disc rotation. This causes the read/write head to fly 0.30 microns (12 microinches) or less above the surface of the magnetic disc.

The disc itself is composed of several layers of material. A substrate, typically an aluminum alloy, is the supporting base upon which thin films of magnetic layers and overcoat layers are deposited. The magnetic disc retains certain surface characteristics of the substrate even after deposition of the other layers. These characteristics play a critical role in supporting the air bearing on the read/write head in flight above the disc surface.

Substrates are typically produced by a formation process having several process steps. Each process step is performed according to a number of process parameters. To maintain a proper head/disc separation during drive operation, each substrate produced must adhere to certain specifications. Part of the specification requires the substrate surface to be within certain limits described in terms of axial runout, velocity and acceleration. These characteristics are collectively known in the disc drive industry as RVA, and they can vary along with variations in the process parameters used in forming the substrate.

In traditional production testing of substrate RVA, the substrate is mounted on an air spindle rotating at approximately 60 Hertz (3600 rpm). A capacitance probe moves from the outer radius to the inner radius of the substrate forming a spiral pattern on the surface of the substrate. An axial runout signal representing axial runout along the substrate surface is generated by the capacitance probe and processed by analog low-pass filters and op-amp differentiators. This signal processing provides velocity and acceleration signals. These signals are provided to peak detect circuits which are used in go/no-go type substrate screening.

Such tests can only measure a product's specification conformance. They lack any capability in process monitoring. Therefore, where substrates fail the go/no-go type screening process, these tests cannot be used to determine what portion of the substrate formation process is causing the substrates to be out of specification. Further, these tests cannot be used to experiment with, and improve the substrate manufacturing process or to adjust the process parameters.

SUMMARY OF THE INVENTION

A magnetic disc formation process has a plurality of process steps performed according to a set of process parameters. A displacement signal is obtained which is representative of surface displacement of the substrate after at least one of the process steps. A first spectral signature is determined based on the displacement signal. The first spectral signature has characteristics representative of the displacement of the substrate when the substrate is processed according to a first set of process parameters. The first spectral signature is compared with a second spectral signature having characteristics indicative of surface displacement of a substrate when processed according to a second set of process parameters. Based on the comparison, the first or second set of process parameters are identified which provide a spectral signature closest to a desired spectral signature.

DETAILED DESCRIPTION OF THE PREFERRED EMBODIMENTS

A. Substrate Fabrication

Figure 1:
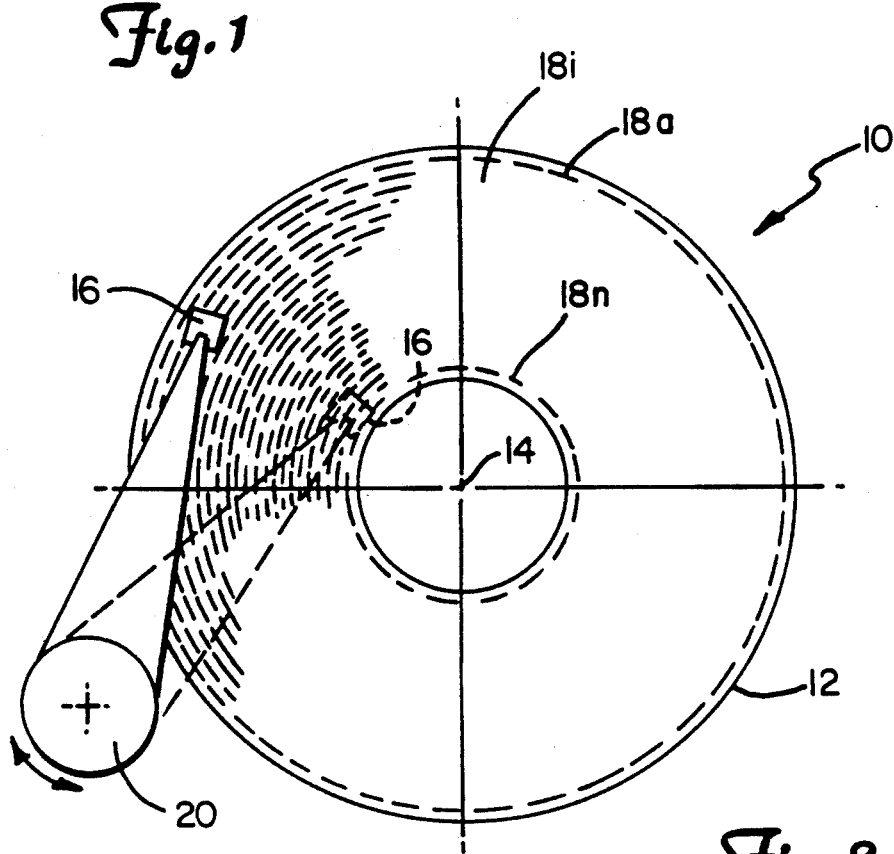
FIG. 1 is a plan view of a portion of a conventional disc drive.

FIG. 1 shows a portion of a disc drive 10 having a magnetic media data storage disc 12, an associated slider 16 and a rotary actuator 20. Magnetic disc 12 is mounted for rotation on a spindle centered on axis 14. A slider 16 holds a magnetic transducer (not shown) and also has an air bearing facing disc 12. During rotation of disc 12, the air bearing generates a hydrodynamic lifting force which causes slider 16 to fly just over the surface of magnetic disc 12. Data blocks are arranged in a plurality of radially concentric tracks 18a through 18n. Data tracks 18a and 18n are outermost and innermost data tracks, respectively. Slider 16 is moved by rotary actuator 20 to position transducer 26 over an appropriate data track, such as data track 18i.

Figure 2:
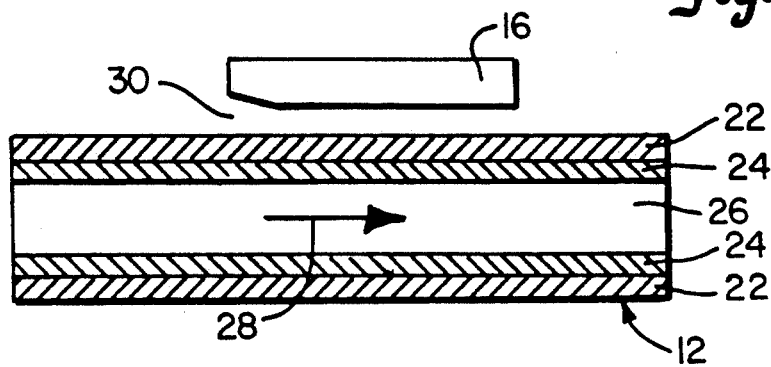
FIG. 2 is an enlarged partial cross-sectional view of the disc drive shown in FIG. 1.

FIG. 2 is an enlarged side view of a portion of disc drive 10. FIG. 2 shows disc 12 in partial cross-section. Disc 12 is composed of several layers of material including overcoat layer 22, magnetic layer 24, and substrate 26. Since data is typically stored on both surfaces of disc 12, magnetic layer 24 and overcoat layer 22 are applied to both surfaces of substrate 26.

Substrate 26 is typically an aluminum alloy substrate which supports layers 22 and 24. Layer 22 is a thin film of overcoat material, and layer 24 is a thin film of magnetic material. Layers 22 and 24 are typically deposited on substrate 26 using a sputtering technique, or any other suitable deposition technique.

Slider 16 is shown in the flying position above disc 12. As disc 12 rotates in the direction indicated by arrow 28, an air bearing on the bottom surface of slider 16 generates a hydrodynamic lifting force which lifts slider 16 off the overcoat layer 22 of disc 12. Slider 16 is lifted off the disc surface a separation distance 30 which is typically on the order of 0.30 microns.

There are several process steps in the formation process utilized to manufacture substrate 26. First, blank substrates are purchased from a substrate vendor. Then, the substrates are thermally flattened. During thermal flattening, the substrates are typically heated in an oven and weighted to flatten the blanks. Then, the thermally flattened blanks proceed to a rough double disc ground processing step (DDGR). During the DDGR step, the substrate is placed between two rough stones and ground to smooth the surfaces of the substrate. Then, the substrate undergoes fine double disc ground (DDGK) processing The DDGK step is the same as the DDGR step except that the grinding stones used have a finer texture. Then, the substrates undergo a nickel polish step (NiPol). During the nickel polish step, the substrates are plated with nickel and polished.

When substrate 26 is formed, it obtains certain surface characteristics during each process step. Some of the surface characteristics are retained even after layers 22 and 24 are deposited on substrate 26. These characteristics determine certain components of the hydrodynamic lifting force and, consequently, play a critical role in determining the separation distance 30 at which slider 16 travels above disc 12.

B. Topography Examination

1. Obtaining RVA

Figure 3:
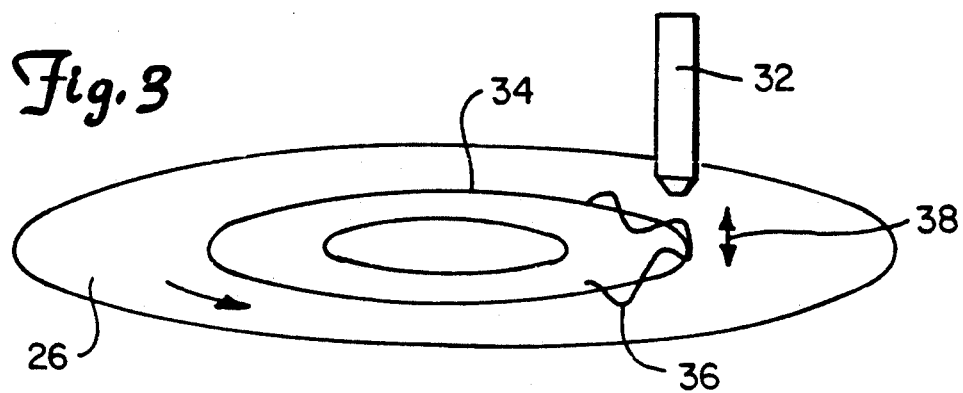
FIG. 3 shows a disc and a displacement sensor used to determine a circumferential surface waveform

In order to determine whether substrate 26 meets certain specifications, the topography of the substrate must be examined. The substrate topography can be described by a surface waveform generated by measuring surface displacement in the axial direction along a circumference of substrate 26. FIG. 3 illustrates a method for generating such a surface waveform.

FIG. 3 shows a capacitance probe 32 positioned over the surface of substrate 26 at a given radius 34. As substrate 26 is rotated, capacitance probe 32 generates a displacement signal representative of surface displacement of substrate 26 in the axial direction indicated by arrow 38. Capacitance probe 32 is coupled, for example, to a test computer which acquires 1024 points of runout or displacement data from the displacement signal for each revolution of substrate 26 corresponding to the particular radius 34 beneath probe 32.

The test cell for producing the displacement data from substrate 26 includes a personal computer equipped with data acquisition and control software. During data acquisition, the substrate 26 is clamped on an air bearing spindle and an actuator carries the capacitance probe in the radial direction over substrate 26. An optical encoder is mounted on a shaft of the air bearing spindle and provides an index trigger and sector pulses for sampling control.

The displacement signal is typically in the form of a waveform, illustrated graphically in FIG. 3 by waveform 36. Waveform 36 is comprised of wavelets which vary as the axial displacement on the surface of substrate 26 varies along the circumference of substrate at the given radius 34. The wavelength of the wavelets in waveform 36 can be translated into frequency as follows:

$$f = \frac{2\pi r w}{l} \text{ (Hz)} \qquad \text{Eq. 1}$$

where
f = frequency;
r = measurement radius (mm);
w = disc rotating speed (Hz); and
l = wavelet wavelength (mm)

Thus, the waveform lends itself to Fourier analysis. Based on a 60 Hz substrate rotation rate, a waveform frequency content below 30 kHz at a radius of 10 cm is referred to as circumferential waviness.

Figure 4:
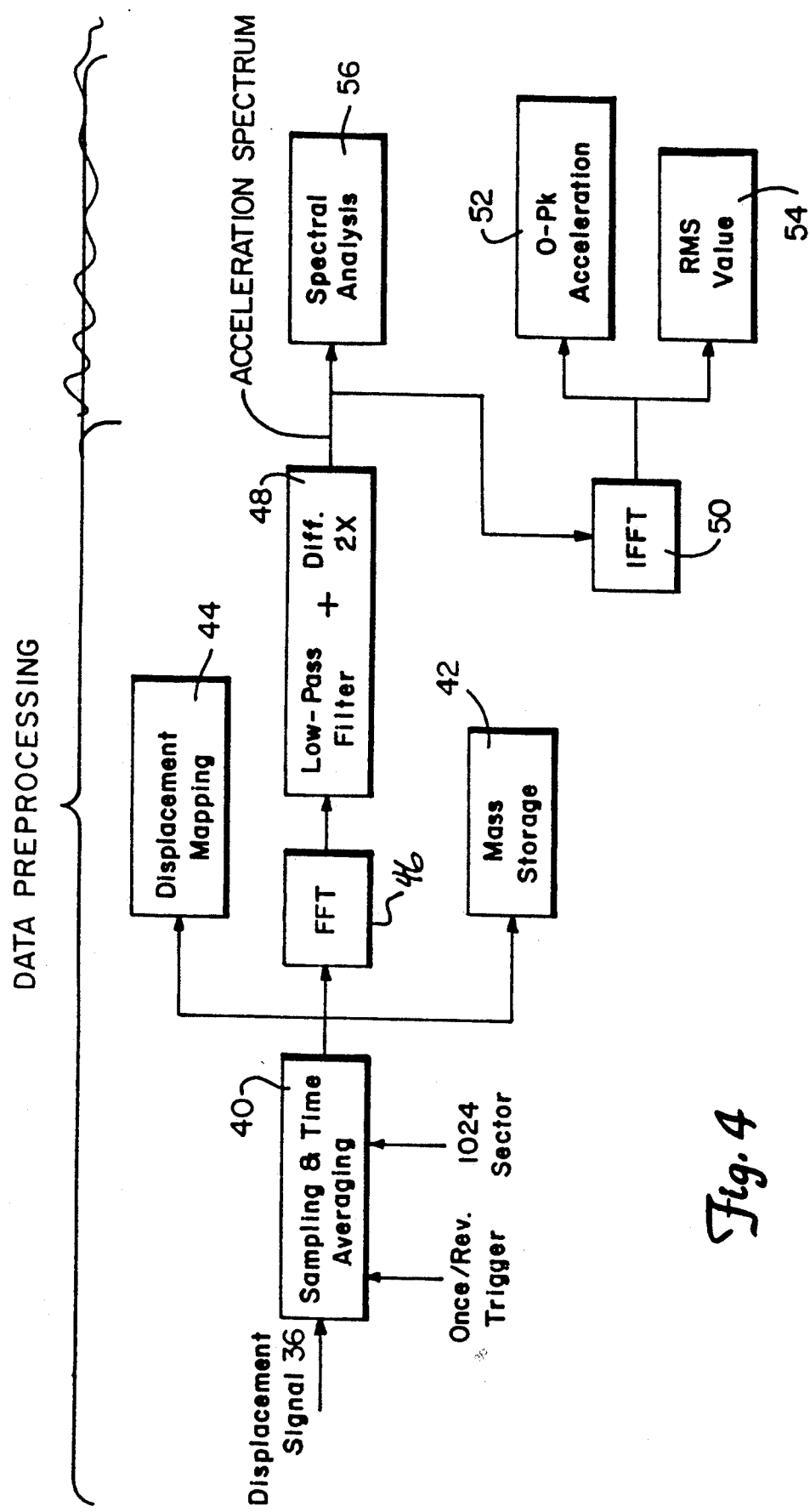
FIG. 4 is a block diagram showing signal processing of a displacement signal.

FIG. 4 shows a flow chart representing signal acquisition and processing. The displacement signal 36 is provided to sampling and time averaging block 40. Also, a signal dividing each sector of substrate 26 into 1024 points, as well as the index trigger from the optical encoder on the air bearing spindle are provided to sampling and time averaging block 40. Sampling and time averaging block 40 provides synchronous time domain averaging of the displacement signal in order to enhance the signal-to-noise ratio of the signal. Also, the synchronous time domain averaging averages out non-synchronous substrate vibration during measurement. Hence, by time averaging the displacement data, the circumferential waviness of the disc is extracted from the signal.

Then, the 1024 points of averaged data are stored in a mass storage system, and capacitance probe 32 is moved to the next radius on substrate 26 to acquire another set of data. In this way, a map of substrate surface displacement can be obtained. This is shown in blocks 42 and 44.

For each radial step along substrate 26, a Fast Fourier Transform (FFT) is applied to the sampled and time averaged displacement signal. This is indicated by block 46. The output of the FFT block 46 provides a displacement spectrum which is then low-pass filtered and differentiated twice in block 48. By multiplying the displacement spectrum by the transfer function of the low-pass filter, and then applying two frequency domain differentiations, block 48 provides an acceleration spectrum. An inverse FFT (IFFT) is applied to the acceleration spectrum in block 50 to obtain a time domain waveform where the peak values can be checked against substrate specifications for go/no-go testing. The RMS value of the acceleration spectrum can also be obtained. This is indicated in blocks 52 and 54.

It should also be noted that the axial runout of the substrate surface can be obtained by determining the difference between a maximum and minimum radial excursion in the sampled and time averaged displacement signal provided by block 40. Further, by multiplying the transformed output of block 46 by the transfer function of a low-pass filter, and by doing only one differentiation, the velocity spectrum of the displacement signal can be obtained. Thus, with minimal addition to the block diagram shown in FIG. 4, the RVA characteristics of substrate 26 can be obtained.

2. Spectral Analysis

The present invention also provides spectral analysis block 56. In spectral analysis block 56, one or more features are extracted from the acceleration spectrum of the displacement signal provided by block 48. These features are used for monitoring the formation process of substrate 26 to determine whether the process steps are operating sufficiently, and also to determine improvements which can be made in the processing steps.

a. Training The System

Figure 5:
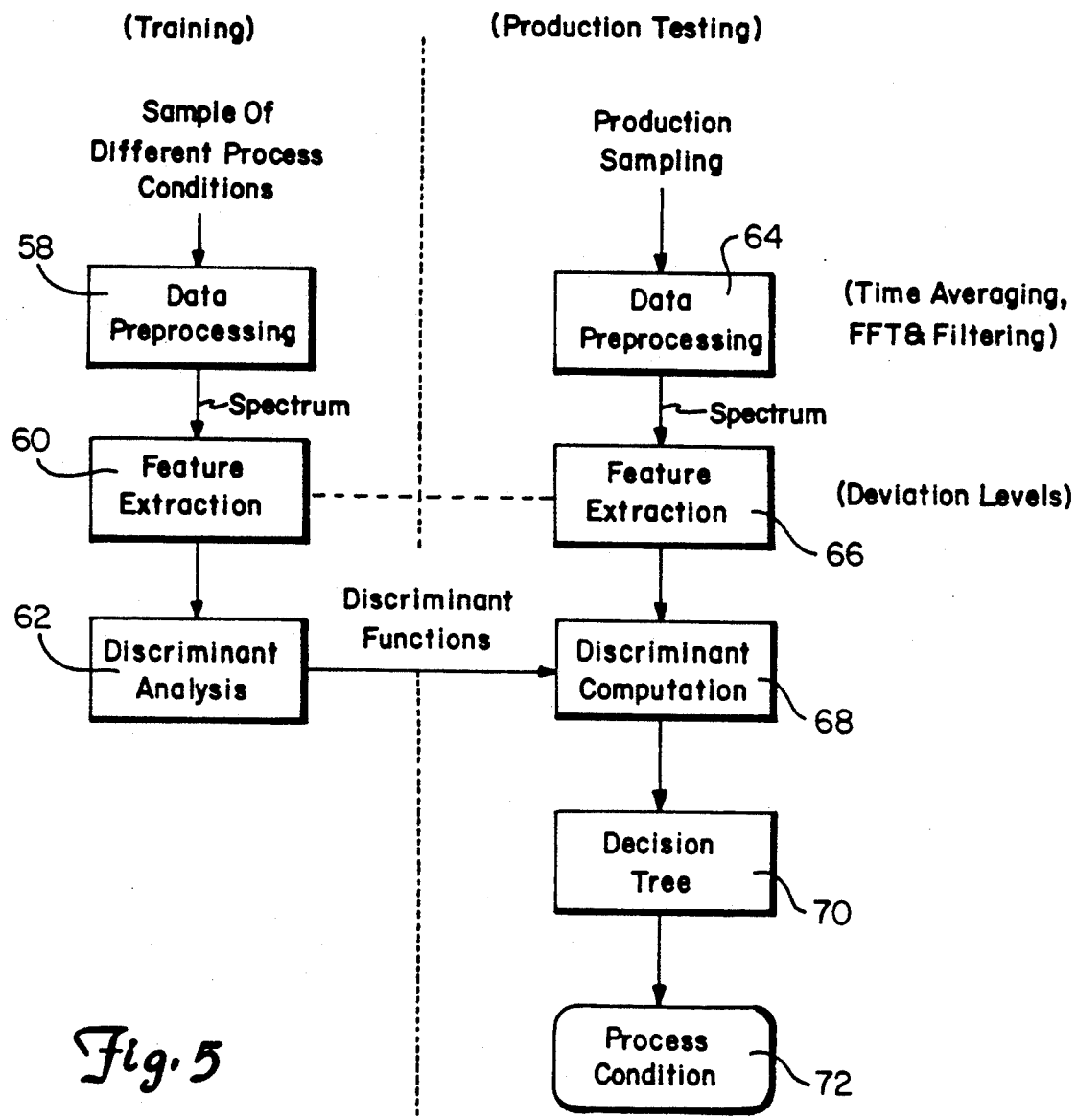
FIG. 5 is a block diagram illustrating the operation of a signature analysis system.

FIG. 5 is a more detailed block diagram making use of the information provided by spectral analysis block 56 shown in FIG. 4. In order to automate the system for process monitoring and control, the analysis system must first be trained. In other words, a displacement signal must be obtained from various substrates which were produced according to a variety of known, deficient process conditions. These displacement signals can be preprocessed using the data preprocessing circuitry shown in FIG. 4. Thus, the acceleration spectrum for these displacement signals is obtained. This is shown by block 58 in FIG. 5.

Next, a feature is extracted from the acceleration spectrum provided. The broad band characteristics of the acceleration spectrum show that a band limited computation of the spectral energy deviation level is suitable for feature extraction. A preliminary base line signature is established using a plurality of averaged samples taken from substrates made under normal operating conditions. That average signature is used as a reference (i.e., a spectral mask) for computing the deviation levels within frequency bands containing information that reflects a given process step. The spectral energy deviation level is defined as follows:

$$Dev = \sum_{f=f1}^{f2} |20 * Log(Mag(f)) - 20 * Log(Mag(f)_{ref})| \quad \text{Eq. 2}$$

where
$Mag(f)^2 = r1(f)^2 + im(f)^2$; and
$Mag(f)$ = magnitude of the acceleration spectrum (mm/sec$^2$);
$Mag(f)_{ref}$ = magnitude of the reference acceleration spectrum (mm/sec$^2$);
Dev = deviation level (mm/sec$^2$);
f1 = lower limit of the frequency band (Hz);
f2 = upper limit of the frequency band (Hz);
r1 = real part of the acceleration spectrum (mm/sec$^2$); and
im = imaginary part of the acceleration spectrum (mm/sec$^2$).

Once the base line or spectral mask is established, the spectral energy deviation levels can be extracted from the acceleration spectra obtained from the substrates processed using known, deficient process conditions. This extraction is accomplished using normal feature extraction methods. This is illustrated in block 60. Then, a discriminant analysis is performed on the features extracted to develop discriminant functions. This is illustrated in block 62. These discriminant functions, then, can be applied to features extracted from substrate production samples to determine which, if any, of the known deficient process conditions are present in the substrate formation process used in production.

b. Utilizing The Trained System In Production

Once the system is trained, it can be used in monitoring production of substrates. The displacement signal of a production sample is preprocessed using the data preprocessing technique described in FIG. 4 to obtain the acceleration spectrum. This is shown in block 64. The acceleration spectrum is then provided to feature extraction block 66 where the same feature is extracted as that used in training the system. In this preferred embodiment, the spectral energy deviation levels are extracted from the acceleration spectrum. Then, applying the discriminant functions developed during system training, a discriminant computation is performed to obtain discriminants representing the displacement signal. These discriminants are subjected to decision tree logic to identify the state of a process condition which may need to be adjusted, or which is functioning adequately. This is shown in blocks 68, 70 and 72.

For example, based on the discriminants obtained, and the decision tree logic performed, the system may identify the DDGK process step, and a particular process condition of the DDGK step which needs to be adjusted to bring the substrate fabricated according to the production process within specification. Examples of such a process condition adjustment within the DDGK step may be that the DDGK pressure is too high or too low.

Figure 6:
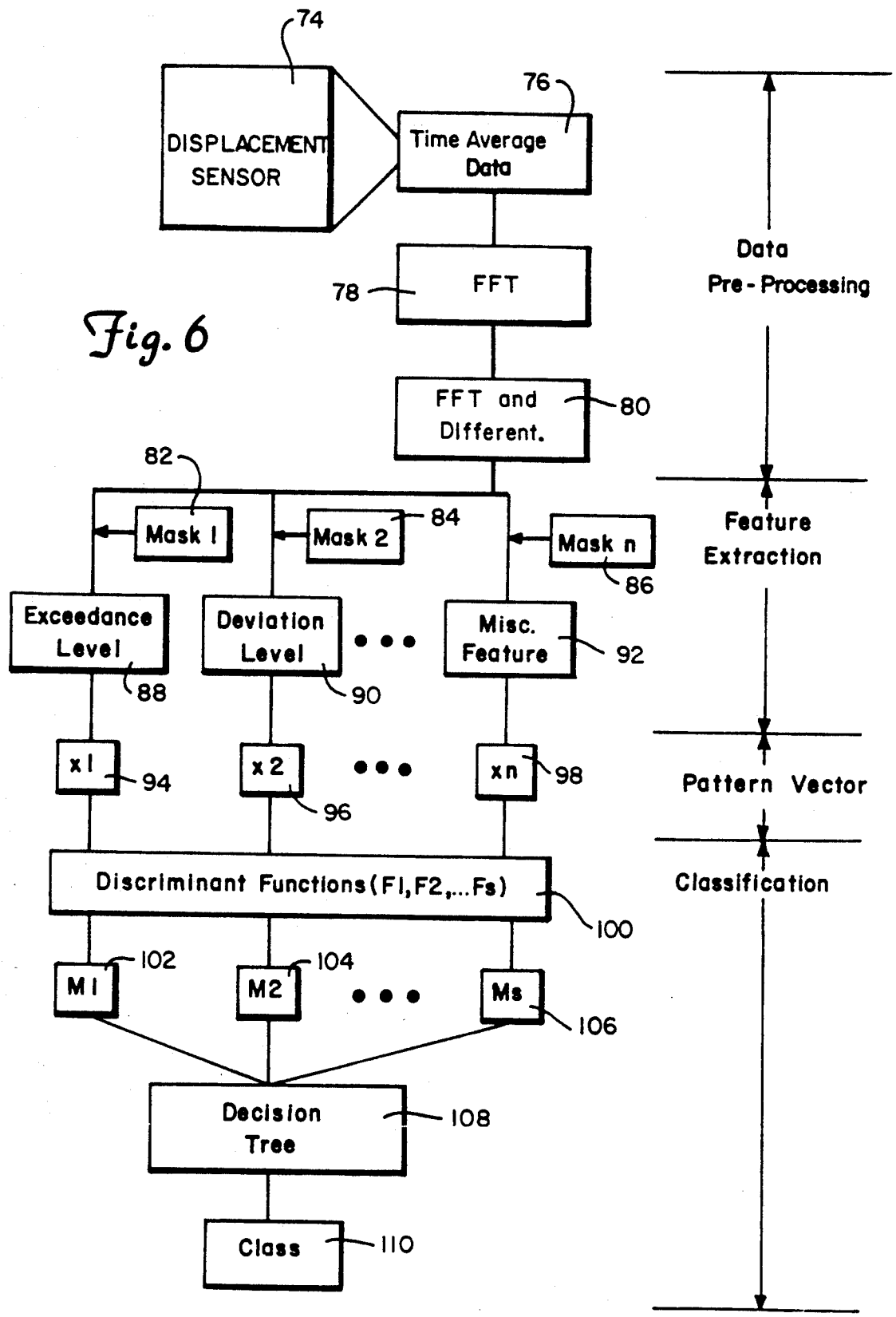
FIG. 6 is a more detailed diagram of one embodiment of the signature analysis system shown in FIG. 5.

FIG. 6 is a more detailed block diagram of the production testing system shown in FIG. 5 showing a system where a plurality of features are extracted. The displacement sensor shown in block 74 (of which capacitance probe 32 is one example) provides the displacement signal to the data preprocessing network where the data is time averaged, a Fast Fourier Transform is applied to the time averaged signal, and the signal is then filtered and differentiated to produce the acceleration spectrum. This is illustrated in blocks 76, 78 and 80.

Then, feature extraction is applied to the acceleration spectrum. During feature extraction, the acceleration spectrum is provided to a number of spectral masks which were developed during system training. This is indicated in blocks 82, 84 and 86. Based on the acceleration spectrum and the spectral masks, a plurality of features are extracted for further processing. The features can include spectral energy deviation level, exceedance level or any other feature which may be useful in monitoring or improving the substrate formation process. This is indicated in blocks 88, 90 and 92. A pattern vector is then obtained having vector components which include the features extracted. This is indicated in blocks 94, 96 and 98.

Then, discriminant functions are applied to the pattern vector. The discriminant functions are those which were developed during training of the spectral analysis system. This is indicated in block 100. From application of the discriminant functions to the pattern vector, a number of discriminants are obtained which represent certain surface characteristics of the substrate 26. These discriminants are applied to a decision tree logic network which classifies the discriminants thereby determining information about the substrate formation process which may need to be adjusted or which may be functioning properly. For example, the system shown in FIG. 6 may indicate that certain process parameters must be adjusted for optimum substrate processing. This is indicated in blocks 102, 104, 106, 108 and 110.

EXAMPLE 1

Monitoring the Process

As one example of the use of spectral signature analysis in substrate manufacturing, ten substrates were manufactured using the thermal flatten, DDGR, DDGK, and NiPol process steps illustrated above. Ten samples of time averaged displacement data (one from each substrate) were collected after each step of the normal production process. The time averaged acceleration spectral data taken from each disc after the same process step was then spectrally averaged using sample averaging. The averaged spectra were smoothed using a Cepstral filtering technique illustrated in FIG. 7. The Log-Mag acceleration spectrum was transformed to the Cepstral domain using another Fast Fourier Transform. Then, the transformed cepstrum was filtered using a Cepstral short pass filter. The high frequency values in the cepstrum were first zeroed out, then an inverse Fast Fourier Transform was performed to obtain the smoothed spectrum. This is illustrated in blocks 112, 114, 116, 118 and 120 of FIG. 7.

Figure 7:
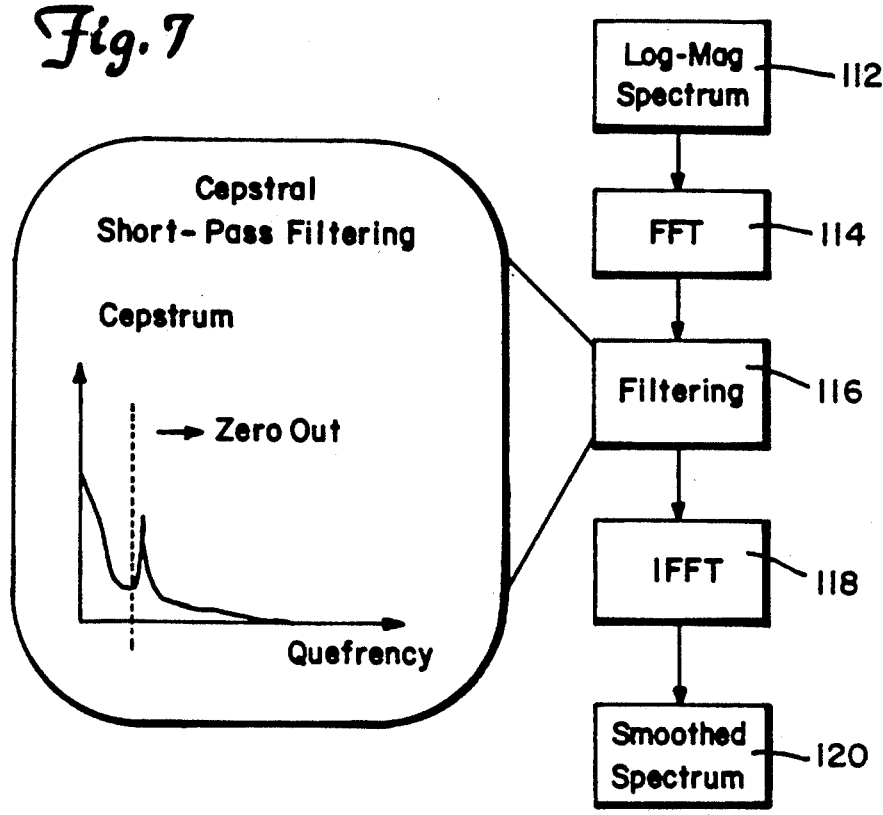
FIG. 7 is a block diagram showing spectral smoothing using a Cepstral filtering technique.
Figure 8A:
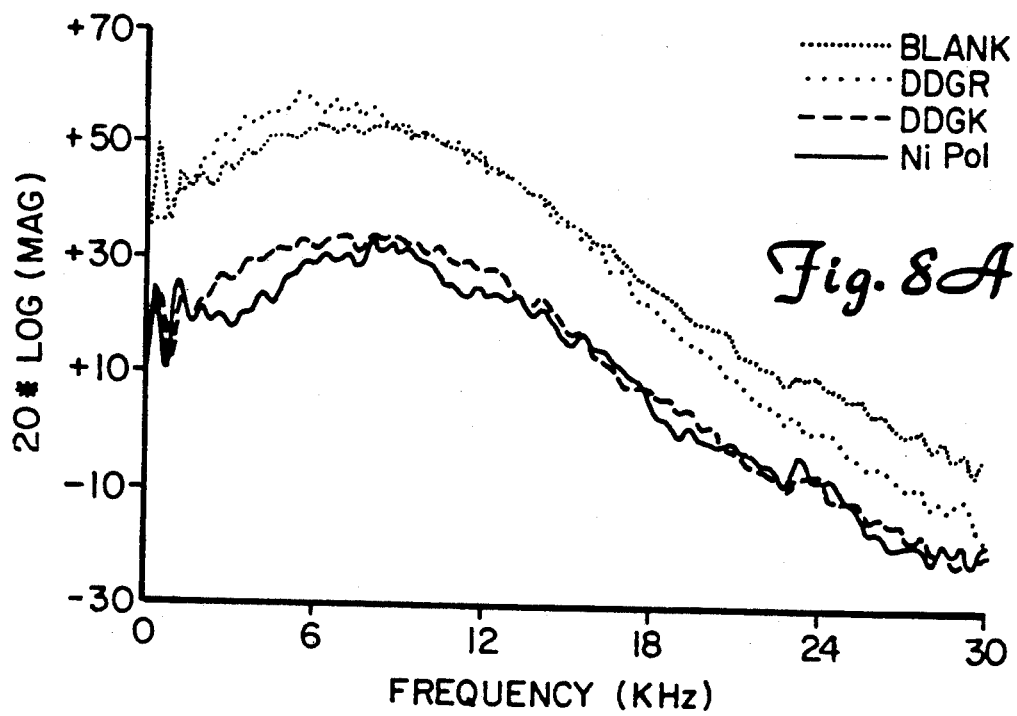
FIGS. 8A-8C are graphs showing overlay spectra obtained for various process steps at outer, middle and inner substrate radii, respectively.
Figure 8B:
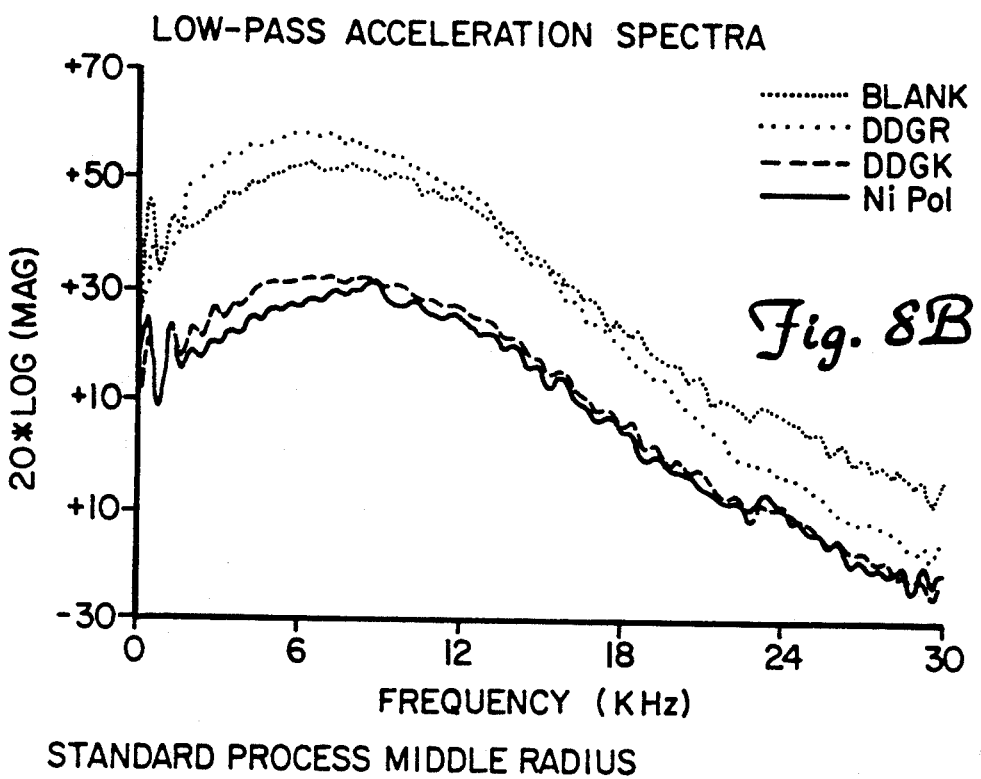
Figure 8C:
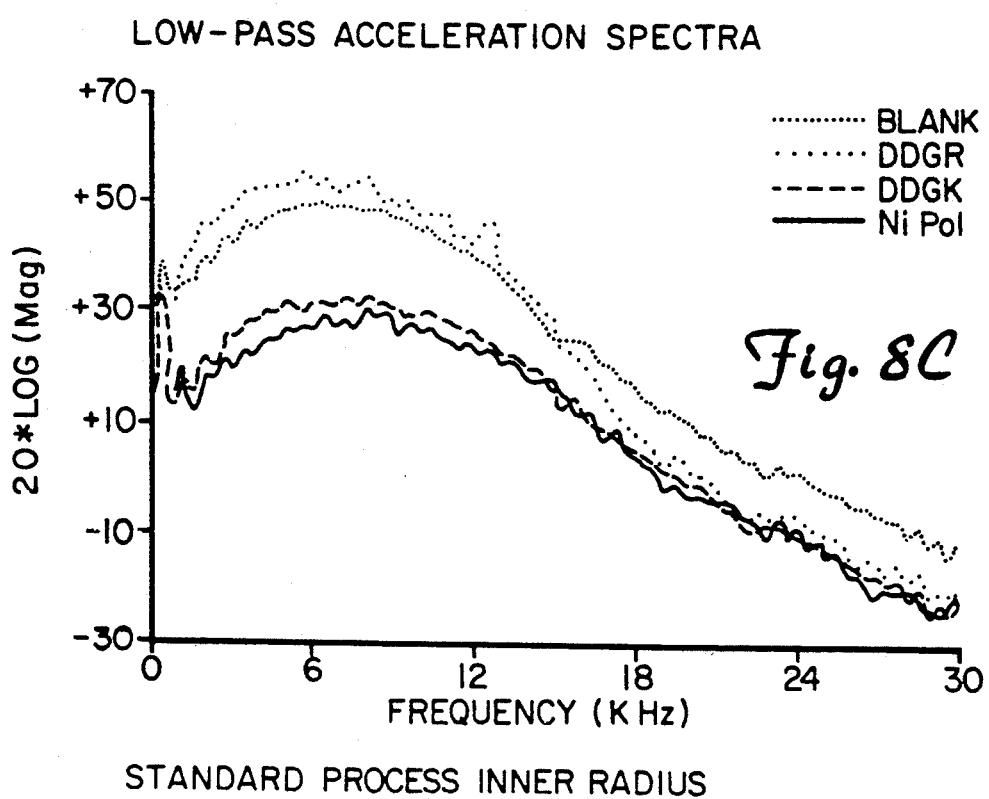

The Log-Mag spectra derived from the smoothing technique in FIG. 7 showed that the spectral values underwent a reduction as the substrate manufacturing process proceeded from the first process step (blank) to the final process step (NiPol). These results are shown in FIGS. 8A, 8B and 8C. The spectra also indicated that the surface waveform of the substrate at the blank varied from the outer to the inner radius of the substrate. However, after processing through the NiPol process step, insignificant differences existed between the outer and inner radii.

The spectra derived show the uniqueness of each process step. The DDGR process removes energy from the surface wave form in the 14-30 kHz range at all the radii, but more distortion is introduced at a lower frequency range of 0.9-14 kHz as indicated by the rise in the spectrum. The DDGK process step smooths out the surface considerably as shown by the overall drop in the spectrum energy level. In the DDGK step, more spectral energy was removed at the lower frequency range, especially at the inner radius. The NiPol step smooths the surface of the substrate the most below a range of approximately 12 kHz. These spectra can now be used as spectral masks for production samples in monitoring the various process steps of the substrate formation process.

EXAMPLE 2

Improving the Process

Figure 9A:
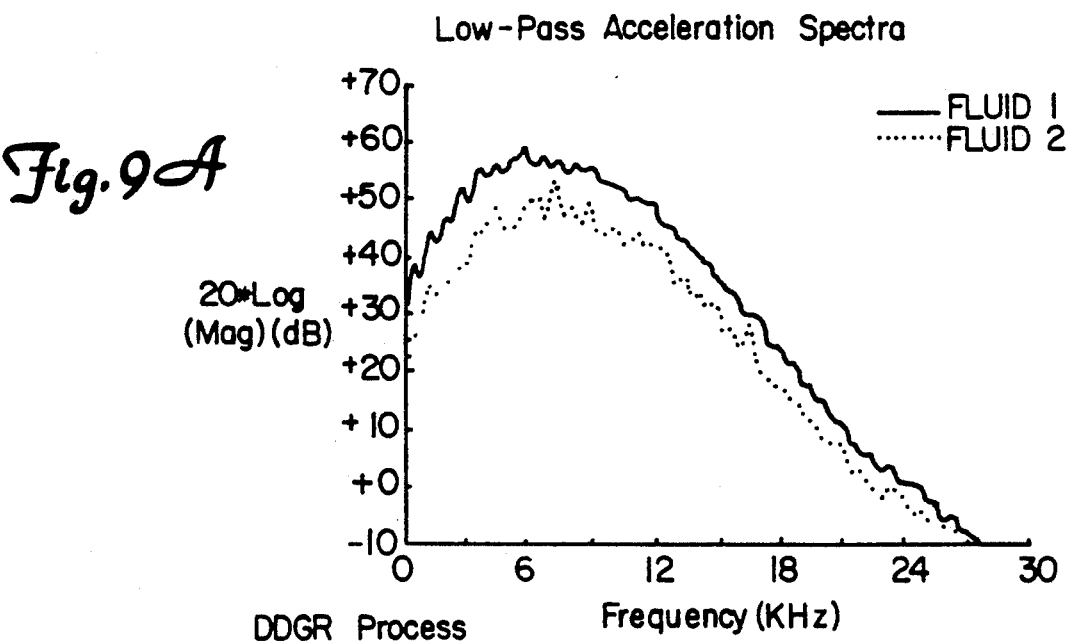
FIGS. 9A and 9B are graphs showing a comparison of acceleration spectra obtained by adjusting parameters in a first and a second substrate processing step, respectively.
Figure 9B:
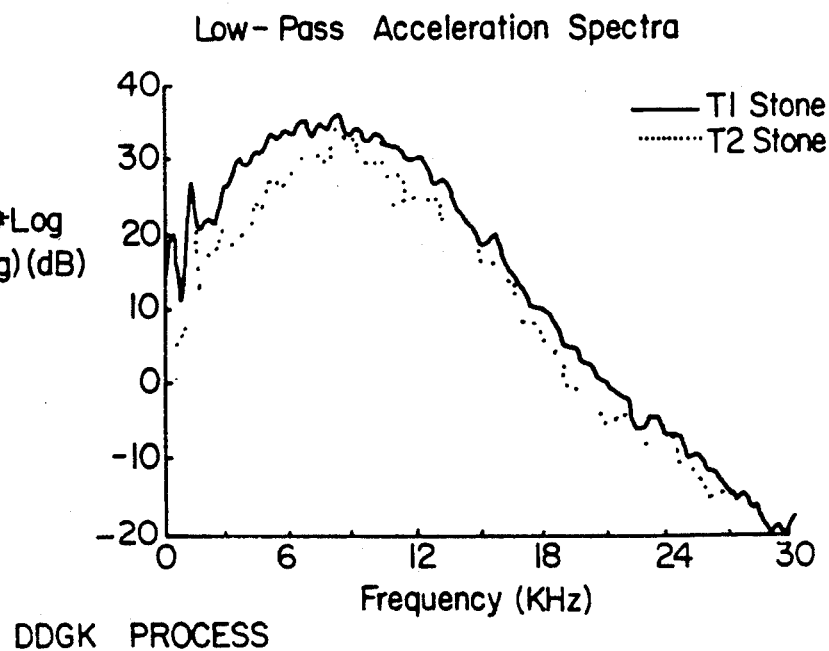

The spectral signature analysis system can also be used in experimenting with, and improving the substrate formation process. For example, FIGS. 9A and 9B are graphics showing spectra corresponding to two process steps using different process parameters. FIG. 9A shows the low-pass acceleration spectra corresponding to the DDGR process step using two different types of fluids. The grinding fluid type 2 used in the DDGR process step is more desirable than fluid type 1 since the overall spectral energy content is lower after processing using the type 2 fluid. In the example shown in FIG. 9A, the type 1 fluid was oil and the type 2 fluid was water.

FIG. 9B shows the acceleration spectra corresponding to the DDGK process step using two different process parameters. Two types of stones were used in the graph shown in obtaining the spectra in FIG. 9B. Better performance was obtained using the type 2 stone since the overall spectral energy content was lower after the DDGK process step using the type 2 stone.

C. Conclusion

The present invention is a system which uses spectral signature analysis in the production of substrates used in magnetic discs. Various features can be extracted from the spectra so that different process steps and process conditions can be identified which are causing substrates to be manufactured in non-conformance with specification. The present system can also be used in experimenting with, and improving processes used in forming substrates.

It should be noted that several software packages are available for generating discriminants for classification obtained in the present system. These software packages typically generate coefficients for discriminant functions used in the system, and use cluster analysis functions in classifying various discriminants obtained. One such software package is available under the name STATGRAPHICS sold by STSC, Inc. of Rockville, Md.

It should also be noted that the present system can be implemented using several different methods of obtaining the displacement signal from the surface of the substrate. For example, optical measurement devices are available for providing such a signal. Also, the same data process technique of FIG. 6 without block 80 can be applied to other signals obtained from lube thickness and friction sensors to monitor other steps in the process of manufacturing the complete magnetic disc.

Although the present invention has been described with reference to preferred embodiments, workers skilled in the art will recognize that changes may be made in form and detail without departing from the spirit and scope of the invention.

What is claimed is:

1. A method of controlling a process for forming a substrate used in a magnetic disc, the process having a plurality of process steps, the method comprising:
   obtaining a displacement signal representative of axial displacement of the substrate;
   determining an acceleration spectrum based on the displacement signal, the acceleration spectrum having an acceleration signature;
   extracting a feature from the acceleration signature;
   applying a discriminant function to the feature extracted to obtain discriminants; and
   controlling the process for forming the substrate based on the discriminants obtained.

2. The method of claim 1 and further comprising:
   performing the steps of obtaining a displacement signal, determining an acceleration spectrum, extracting a feature, and applying a discriminant function, after each of the plurality of process steps.

3. The method of claim 2 and further comprising:
   performing the step of controlling after each of the process steps.

4. The method of claim 1 and further comprising:
   determining, based on the displacement signal, whether the substrate conforms to a desired displacement limit.

5. The method of claim 1 wherein each process step is performed under process step parameters, and wherein controlling the process comprises:
- determining whether the process step parameters corresponding to a particular process step are unacceptable based on the discriminants obtained; and
- generating a correction signal identifying unacceptable process step parameters.

6. The method of claim 5 wherein controlling the process further comprises:
- adjusting the unacceptable process step parameters based on the correction signal.

7. The method of claim 1 and further comprising:
- averaging the displacement signal synchronously in the time domain;
- generating an average signal based on the averaged displacement signal.

8. The method of claim 7 wherein determining an acceleration spectrum comprises:
- transforming the average signal to the frequency domain to obtain a displacement spectrum;
- filtering the displacement spectrum; and
- differentiating the filtered displacement spectrum in the frequency domain two times to obtain the acceleration spectrum.

9. The method of claim 1 wherein extracting a feature from the acceleration signature comprises:
- determining spectral energy deviation levels as compared to a known spectral energy reference level.

10. A method of controlling a substrate processing system for processing substrates used in magnetic discs, the method comprising:
- obtaining a displacement signal representative of surface displacement of the substrate;
- determining a first spectral signature based on the displacement signal, the first spectral signature having characteristics representative of a current set of process conditions in the substrate processing system;
- comparing the first spectral signature with a second spectral signature having characteristics representative of a substrate processed in the substrate processing system under a known set of process conditions; and
- controlling the substrate processing system based on the comparison of the first spectral signature with the second spectral signature.

11. The method of claim 10 wherein controlling the substrate processing system comprises:
- identifying particular process conditions in the current set of process conditions causing undesirable differences between the first and second spectral signatures; and
- adjusting the processing system to change the particular process conditions identified.

12. The method of claim 10 wherein the substrate processing system processes substrates in a plurality of process steps, and further comprising:
- repeating the steps of obtaining a displacement signal, determining a first spectral signature, comparing, and controlling, after each of the plurality of process steps.

13. The method of claim 10 wherein the step of determining a first spectral signature comprises:
- averaging the displacement signal synchronously in the time domain;
- generating an average signal based on the averaged displacement signal;
- transforming the average signal to the frequency domain to obtain a displacement spectrum;
- filtering the displacement spectrum; and
- differentiating the filtered displacement spectrum in the frequency domain two times to obtain an acceleration spectrum having the first spectral signature.

14. The method of claim 10 wherein the first and second spectral signatures are representative of spectral energy levels.

15. The method of claim 14 wherein the step of comparing comprises:
- comparing the spectral energy levels represented by the first and second spectral signatures.

16. An apparatus for controlling a substrate formation process used in forming substrates for magnetic discs, the apparatus comprising:
- a displacement sensor for obtaining a displacement signal representative of surface displacement of the substrate;
- means for determining a first spectral signature based on the displacement signal, the first spectral signature having characteristics representative of a current set of process conditions in the formation process system;
- feature extraction means for extracting a feature from the first spectral signature;
- means for applying a discriminant function to the feature extracted and to classify the feature into a known class, wherein the known class is indicative of the current set of process conditions;
- identification means for providing an identification signal representative of the class; and
- a controller for controlling the formation process based on the identification signal.

17. The apparatus of claim 16 wherein the controller comprises:
- means for adjusting the current process conditions in the formation process based on the identification signal.

* * * * *